June 1, 1965   F. W. LEACH ETAL   3,186,506
AUXILIARY DRIVE MECHANISM FOR AUTOMOTIVE VEHICLES
Filed July 5, 1962
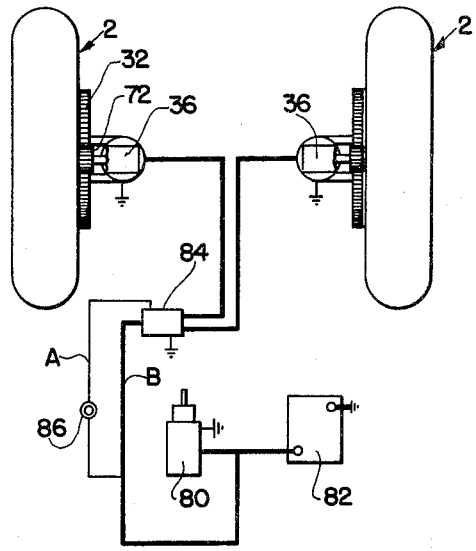
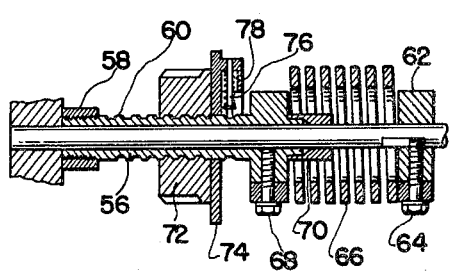
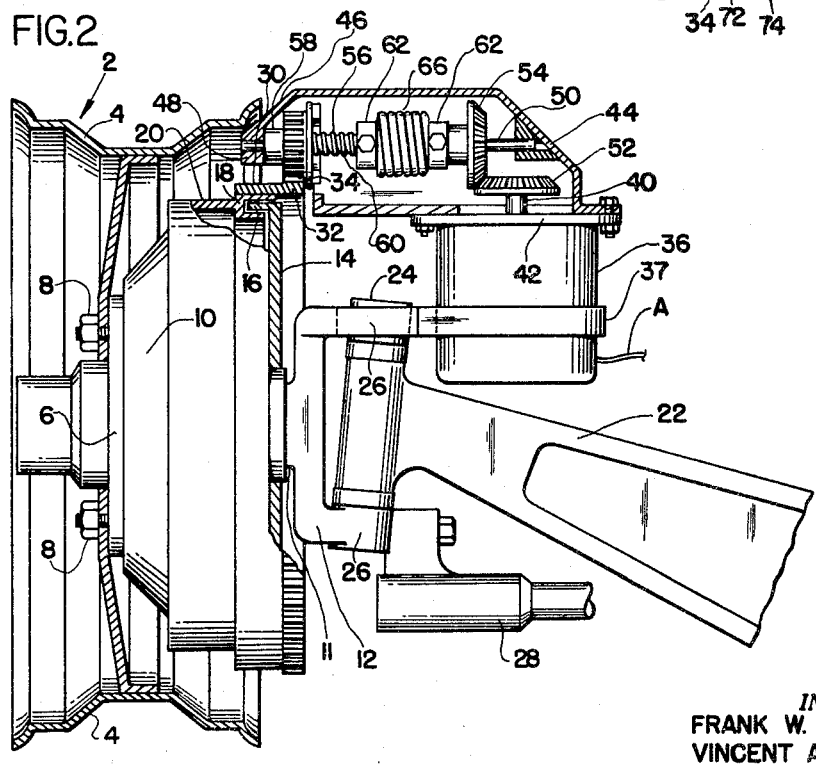
INVENTOR.
FRANK W. LEACH
VINCENT A. OKON
BY
ATTORNEYS United States Patent Office 3,186,506
Patented June 1, 1965

3,186,506
AUXILIARY DRIVE MECHANISM FOR
AUTOMOTIVE VEHICLES
Frank W. Leach, 11 Case St., Hartford, Conn., and
Vincent A. Okon, 280 Matianuck Ave., Windsor, Conn.
Filed July 5, 1962, Ser. No. 207,522
10 Claims. (Cl. 180—10)

The present invention relates to automotive vehicles of the type having drive power from the engine supplied to only one set of wheels and more particularly to an auxiliary drive mechanism for driving the unpowered set of wheels of an automotive vehicle.

Generally, passenger automobiles and light trucks employ a transmission delivering drive power from the engine to only one set of wheels, almost exclusively the rear wheels. Occasionally, as when the powered set of wheels rest upon snow, ice, or sand, they cannot obtain sufficient traction upon the underlying surface sufficiently to move the vehicle although the other set of wheels may be in firmer relationship with respect to its underlying surface. Accordingly, vehicles have been produced with four-wheel drive to enable the vehicle to permit facile self-extraction from such a tractionless predicament.

It is the aim of the present invention to provide a relatively simple and economical auxiliary drive mechanism for the unpowered set of wheels of an automotive vehicle which can be readily engaged when required to supply power to the wheels to extricate the vehicle and which can be incorporated upon existing vehicles without major alteration.

Another aim is to provide such an auxiliary drive mechanism for the front wheels of an automotive vehicle which is operable in all pivotal positions of the wheels during turning movement and in which the engagement between the wheels and auxiliary power drive automatically terminates upon movement of the vehicle under power from the engine.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a diagrammatic representation of the essential components of an automotive vehicle embodying the present invention;

FIG. 2 is a fragmentary vertical section through the left front wheel assembly of a vehicle showing a representative installation thereof and having the auxiliary drive means engaged with the wheel to supply rotational movement thereto;

FIG. 3 is a fragmentary vertical section of the drive gear assembly or the auxiliary drive means in FIG. 2 disengaged from the wheel; and FIG. 4 is a sectional view of the drive gear assembly along the line 4—4 of FIG. 3.

It has been found that the foregoing and related aims can be attained by an auxiliary drive mechanism for the unpowered set of wheels which includes ring gears mounted on the wheels, and particularly on their brake drums for rotation therewith and which also includes pinion gears engageable with the ring gears to supply rotational drive power thereto from an electric motor. The pinion gears are carried by pinion support means for rotation and for movement laterally of the ring gears into and out of engagement therewith including drive shafts receiving drive power from the electric motors. The pinion support means are responsive to initial rotation of the drive shafts by the motors to move the pinion gears into engagement with the ring gears to impart rotational movement thereto and are responsive subsequently to a speed of rotation of the ring gears greater than that of the drive shafts to move the pinion gears out of engagement with the ring gears. A switch for actuating and deactuating the electric motors is desirably provided upon the dashboard for convenient access. When used in conjunction with the front wheels, the auxiliary drive units are carried by the wheel support assemblies and pivot therewith during turning movement.

Referring now in detail to the attached drawing, FIGS. 2 and 3 illustrate an installation embodying the present invention in conjunction with the left front wheel of an automotive vehicle. The rotating wheel is generally designated by the numeral 2 and includes the tire rim 4, the wheel hub 6 to which the rim 4 is secured by the mounting bolts 8, and the brake drum 10 which is also carried by the hub 6. In accordance with conventional construction, the wheel hub 6 is supported for rotation upon the wheel spindle 11 of the steering knuckle 12 by a bearing assembly not shown. Nonrotatably carried upon the steering knuckle 12 is the brake drum backing plate 14 which has a peripheral flange 16 extending into a peripheral U-shaped flange 18 formed on the end of the side wall 20 of the brake drum 10 so as to form a seal therewith.

The wheel 2 is supported for pivotal turning movement relative to the frame of the vehicle by the steering knuckle 12 which is pivotally mounted on the end of the axle 22 by the king pin 24 and bearings 26, 26. The steering knuckle 12 is pivoted about the end of the axle 22 by the steering arm 28 which in turn is actuated by the steering assembly not shown. Additional conventional elements and details of construction of the brake drum, hub and axle and steering knuckle fittings have not been shown for purposes of clarity of illustration.

In the illustrated embodiment of the invention, a support portion 30 of a ring gear member 32 has been secured on the flange 20 of the brake drum 10 and has a gear tooth portion 34 at its free or inner end spaced from the inner end of the tire rim 4. An electric motor 36 is mounted in a support bracket 37 which is welded or otherwise secured to the upper leg of the steering knuckle 12 and has its armature shaft 40 extending vertically upwardly. Bolted to the face plate 42 of the motor 36 is the gear housing and drive shaft support member 44 which extends beyond and overlies the gear tooth portion 34 of the ring gear member 32. Journaled in the depending flange portion 46 and the shaft support block 48 of the housing and support member 44 is the drive shaft 50 which is supported for rotation about a horizontal axis. Drive power is supplied to the shaft 50 through the bevel gears 52, 54 which are secured to the armature shaft 40 and drive shaft 50, respectively.

Mounted on the drive shaft 50 is a screw shaft 56 having a stop nut 58 at its outer end overlying the support portion 30 of the ring gear member 32 and an external screw thread designated by the numeral 60 extending therefrom over the gear tooth portion 34 and terminating at a point spaced inwardly therefrom. The screw shaft 56 is driven or turned by the drive shaft 50 through a spring connection provided by the drive head 62 which is keyed to the drive shaft 50 by the drive shaft bolt 64 and the spiral driving spring 66 which operates between the screw shaft spring screw 68 and the drive shaft bolt 64. As best seen in FIG. 4, a compression sleeve 70 is threadably engaged upon the inner end of the screw shaft 56 underlying the driving spring 66.

Rotatably mounted upon the screw thread 60 of the screw shaft 56 is a pinion gear 72 having teeth adapted to cooperate with the teeth of the gear tooth portion 34 of the ring gear member 32 so as to rotate the ring gear member 32 when moved outwardly into engagement therewith. Secured to the inner face of the pinion gear 72 is a counterweight 74 which increases the weight and thereby the inertia of the pinion gear 72. To prevent inadvertent movement of the pinion gear 72 longitudinally of the screw shaft 56 into meshing engagement with the ring gear member 32, an antidrift pin 76 carried by the counterweight 74 is biased into frictional engagement within the screw thread 60 by the drift pin spring 78.

When rotational movement is imparted to the drive shaft 50 through the bevel gears 52, 54, the screw shaft 56 is also turned through the driving spring 66. Since the pinion gear 72 and its counterweight 74 have considerable weight and inertia, they do not rotate but move outwardly along the screw thread 60 from the position shown in FIG. 4 until the pinion gear 72 engages with the gear tooth portion 34 of the ring gear member 32 as shown in FIG. 4. The stop nut 58 limits the outward movement of the pinion gear 72 upon the screw shaft 56 and ensures proper radial alignment of the gear teeth. As the screw shaft 56 continues to rotate, the pinion gear 72 now rotates therewith and thereby rotates the ring gear member 32 and thereby the wheel 2.

When the set of wheels driven by the engine gains traction and commences to drive the vehicle, the pinion gear 72 is automatically disengaged from the ring gear member 32 upon rotation of the unpowered set of wheels 2 faster than the speed of rotation of the drive shaft 50 by the electric motor 36. As the speed of rotation of the wheel 2 and thereby its ring gear member 32 increases beyond that of the drive shaft 50 and the screw shaft 56, the speed of rotation of the pinion gear 72 is also increased beyond that of the screw shaft 56 so that it overruns back along the screw thread 60 and demeshes itself from the ring gear member 32.

A desirable installation for the power supply to the electric motors 36 is diagrammatically illustrated in FIG. 1 wherein the electric motors 36 are supplied with current from the generator 80 and/or battery 82 through the solenoid 84 which is actuated by a switch 86 conveniently located on the dashboard and closing a shunt line designated by the letter A between the power line B and the solenoid 84. Although the switch 86 may be double acting, it is preferable that the solenoid 84 supply current to the motors 36 only so long as the operator is pressing the switch 86 so as to eliminate inadvertent failure to terminate the supply of power thereto.

Thus, in operation of the auxiliary drive mechanism of the present invention, the operator of the vehicle may energize the motors 36 by pressing the switch 86 upon the dashboard when he discovers that the set of wheels receiving power from the engine lacks sufficient traction to move the car. The motors 36 will move the pinion gears 72 into meshing engagement with the ring gear members 32 and impart rotation to the unpowered set of wheels until the wheels 2 rotate faster than the motors 36 at which time the pinion gears 72 automatically demesh and move back along the screw shaft 56.

In the event the motors 36 should be energized inadvertently while the vehicle is moving, the pinion gears 72 will move over into engagement with the ring gear members 32 but will instantaneously demesh due to the greater speed of rotation of the ring gear members 32.

In the illustrated embodiment, the motor and pinion support assembly have been mounted upon the steering knuckles of the wheel support assembly of the front set of wheels so as to pivot with the wheels during turning movement. For some installations, these elements may be mounted on other elements of the pivoting wheel assembly such as the steering arms. In use upon the rear set of wheels where pivoting does not occur, the motor and pinion support assembly may be mounted upon the axle or frame.

Although the ring gear is preferably mounted on the outer periphery of the brake drum, it will be apparent that it may also be mounted on other elements of the rotating wheel assembly such as the tire rim albeit perhaps with lesser effectiveness.

Thus, it can be seen that the present invention provides a highly effective auxiliary drive mechanism for the set of wheels of an automotive vehicle unpowered by the engine which can be readily installed and easily maintained and which is relatively economical. It is applicable to both front and rear sets of wheels and is pivotable with the front wheels so as to provide operation in any pivoted position thereof and is also automatically disengageable upon gaining of sufficient traction by the set of wheels powered by the engine.

The invention claimed is:

1. In an automotive vehicle having an engine delivering power to one of two sets of wheels and also having a battery and a generator, the combination therewith of an auxiliary drive mechanism for the other of said sets of wheels including ring gears mounted on each wheel of said other set for rotation therewith, pinion gears engageable with said ring gears to impart rotational movement thereto, pinion support means carrying the pinions for rotation and for movement laterally of the ring gears into and out of engagement therewith including a drive shaft, electric motor means connected with said battery and generator for rotating said drive shafts to impart rotation to said pinion gears and thereby to said ring gears, and control means for said electric motor means.

2. The combination as set forth in claim 1 wherein each of said wheels in said unpowered set includes a brake drum and wherein said ring gears are mounted respectively on said brake drums.

3. In an automotive vehicle having an engine and front and rear sets of wheels with the engine delivering drive power to one of said sets of wheels and also having a battery and a generator, the combination therewith of an auxiliary drive mechanism for the other of said sets of wheels including ring gears mounted on each wheel of said other set for rotation therewith, pinion gears engageable with said ring gears to impart rotational movement thereto, pinion support means carrying the pinion gears for rotation and for movement laterally of the ring gears into and out of engagement therewith and including a drive shaft, said pinion support means being responsive to initial rotation of the drive shaft to move the pinion gears into engagement with the ring gears to impart rotational movement thereto and responsive subsequently to a speed of rotation of the ring gears greater than that of the drive shafts to move said pinion gears out of engagement, electric motor means connected with said battery and generator for rotating said drive shafts, and switch means for actuating said electric motors.

4. In an automotive vehicle having an engine and front and rear sets of wheels with the engine delivering drive power to one of said sets of wheels and also having a battery and a generator, the combination therewith of an auxiliary drive mechanism for the other of said sets of wheels including ring gears mounted on each wheel of said other set for rotation therewith, pinion gears engageable with said ring gears to impart rotational movement thereto, pinion support means carrying the pinion gears for rotation and for movement laterally of the ring gears into and out of engagement therewith, each of said pinion support means including a drive shaft overlying the ring gear, a screw shaft on said drive shaft having a screw thread extending over the ring gear and terminating at a point spaced from said wheel and upon which said pinion gear is mounted for longitudinal and rotational movement and drive spring means drivingly connecting said screw shaft and drive shaft for simultaneous rotation thereof, said pinion gear being of sufficient weight to move outwardly along said screw thread without rotation during initial rotation of the drive and screw shafts until engaged with said ring gear and being disengageable from said ring gear upon rotation of said ring gear at a speed in excess of that of the drive screw shaft causing the pinion gear to spin away from the ring gear along the screw thread, electric motor means connected with said battery and generator for rotating said drive shafts, and switch means for activating said electric motors.

5. The combination of claim 4 wherein said front wheels include brake drums and said ring gears are mounted on said brake drums.

6. The combination of claim 4 wherein said wheel support assemblies include a steering knuckle upon which said wheels are rotatably mounted and wherein said pinion support means and electric motor means are carried by said steering knuckles for pivotal movement therewith.

7. In an automotive vehicle having an engine and also having a battery and a generator, a rear set of wheels receiving driving power from said engine and an unpowered set of front wheels each rotatably mounted on a wheel support assembly pivotally supported within the frame for turning movement, the combination therewith of an auxiliary drive mechanism for the front set of wheels including a ring gear mounted on each wheel of said front set for rotation therewith, pinion gears engageable with said ring gears to impart rotational movement thereto and thereby to the wheel, pinion support means mounted on the wheel support assembly and carrying the pinion gears for rotation and for movement laterally of the ring gears into and out of engagement therewith, each of said pinion support means including a drive shaft overlying the ring gear, a screw shaft on said drive shaft having a screw thread extending over the ring gear and terminating at a point spaced from said wheel and upon which said pinion gear is mounted for longitudinal and rotational movement and drive spring means drivingly connecting said screw shaft and drive shaft for simultaneous rotation thereof, said pinion gear being of sufficient weight to move outwardly along said screw thread without rotation during initial rotation of the drive and screw shafts until engaged with said ring gear and being disengageable from said ring gear upon rotation of said ring gear at a speed in excess of that of the drive screw shaft causing the pinion gear to spin away from the ring gear along the screw thread, electric motor means connected with said battery and generator for rotating said drive shafts, and switch means for activating said electric motors.

8. The combination as set forth in claim 7 wherein each of said front wheels includes a brake drum and wherein said ring gears are mounted respectively on said brake drums.

9. An auxilary drive mechanism for use with automotive vehicles having an engine delivering power to one of two sets of wheels and also having a battery and a generator, said drive mechanism comprising a pair of drive units each having a ring gear adapted to be mounted upon a wheel of the unpowered set of wheels for rotation therewith, a pinion gear engageable with said ring gear to impart rotation thereto, a pinion support means carrying the pinion for rotation and for movement laterally of the ring gear into and out of engagement therewith and including a drive shaft, said pinion support means being responsive to initial rotation of the drive shaft to move the pinion gear into engagement with the ring gear and responsive subsequently to a speed of rotation of the ring gear greater than that of the drive shaft to move said pinion gear out of engagement, electric motor means connected with said battery and generator for rotating said drive shafts, switch means for actuating said motor means, and means for mounting said motor means and pinion support means upon the vehicle for engagement of the pinion gear with said ring gear.

10. An auxiliary drive mechanism as set forth in claim 9 wherein said ring gear is particularly adapted to be mounted on a brake drum of an unpowered wheel.

References Cited by the Examiner
UNITED STATES PATENTS

| | | | |
|---|---|---|---|
| 810,881 | 1/06 | Pfouts | 180—44 |
| 2,430,528 | 11/47 | Moon | 180—10 |
| 2,699,852 | 1/55 | Cost | 180—44 |
| 2,733,771 | 2/56 | Sullivan | 180—10 X |
| 2,851,115 | 9/58 | Buckendale | 180—44 X |
| 3,049,361 | 8/62 | Ronning | 180—10 X |

FOREIGN PATENTS

| | | |
|---|---|---|
| 636,872 | 5/50 | Great Britain. |

A. HARRY LEVY, *Primary Examiner.*

LEO FRIAGLIA, *Examiner.*